United States Patent Office 2,859,565
Patented Nov. 11, 1958

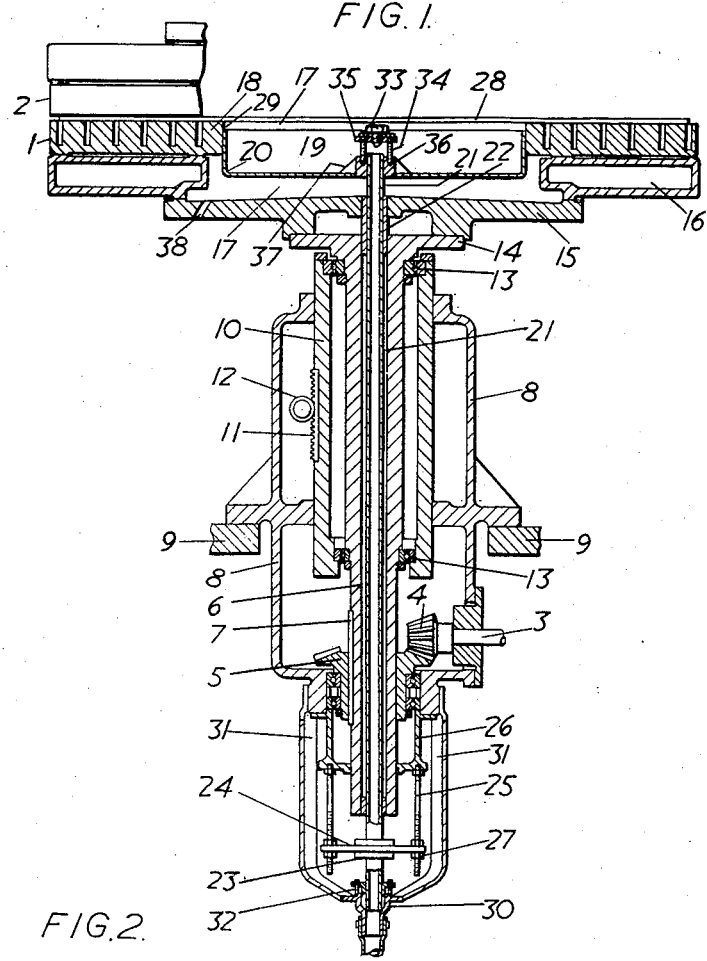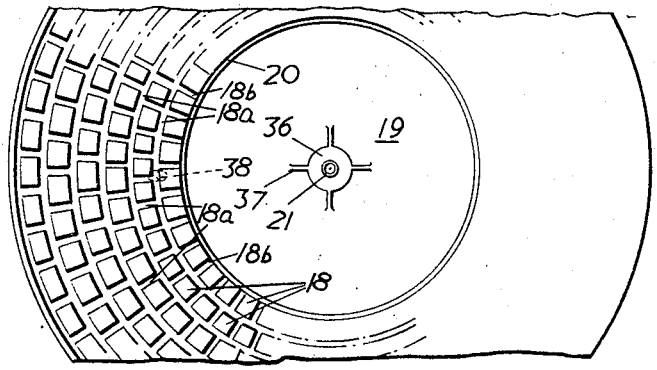

2,859,565

APPARATUS FOR GRINDING FLAT GLASS ON BOTH FACES SIMULTANEOUSLY

Gustave Javaux, Brussels, Belgium, assignor to Pilkington Brothers Limited, Liverpool, England, a corporation of Great Britain Application January 25, 1956, Serial No. 561,299

Claims priority, application Great Britain January 31, 1955

4 Claims. (Cl. 51—112)

This invention relates to an apparatus for continuously grinding the underface of horizontally disposed flat glass in ribbon form.

In grinding glass in horizontal ribbon form, it is usual to grind the ribbon of glass, which is formed from molten glass in a tank, on both faces simultaneously as the ribbon travels forward from the lehr, by employing apparatus comprising coaxial pairs of opposed grinder discs, each rotating about a vertical axis, between which discs the ribbon is advanced whilst being supported in the grinding bays by the bottom grinder discs of the coaxial pairs.

In one known form of such apparatus, each grinder discs comprised an annular grinding surface which surrounds a central cavity in the disc and is in turn surrounded by a continuous rim. The diameter of the central cavity is usually nearly half the outside diameter (about 9 feet) of the disc at the rim.

The grinding surface in such known form of grinder disc was constituted by the operative surfaces of several concentric rings of rectangular nogs separated, as islands, from one another and from the coplanar continuous rim by approximately concentric channels intersected by straight channels extending outwardly from the central cavity to the rim. Such form of grinder is described and illustrated in U. K patent specification No. 267,654.

In operating such apparatus abrasive fluid, usually a mixture of sand and water, is fed under a hydrostatic head to the central cavity of each bottom grinder disc, so as to maintain the cavity and channels full. From the cavity this fluid floods through the channels and reaches the operating surfaces of the nogs as the disc rotates, being caught between the lower surface of the glass and the operating surfaces of the respective nogs, and ultimately finding outlet between the edges of the glass ribbon and the rim of the grinder disc. Thus a film of the abrasive fluid is maintained between the operating surfaces of the nogs and the lower surface of the glass against the pressure exerted upon the glass by the co-operating upper disc.

This pressuure on the fluid, however, must be restricted so as to avoid any pressure in the central cavity exceeding a few inches of water pressure. An excessive pressure in the central cavity tends to raise the glass and prevent the pressure between the glass and the grinding surface being adequate for grinding. As a consequence of the restricted hydrostatic head, the rate of flow of the abrasive fluid up the shaft is also restricted.

In the U. K. patent specification No. 502,118 means are proposed for varying the depth of the channels in grinding discs of apparatus of the kind referred to, to attain adequate feed of abrasive to the operating surfaces of the nogs with a view to avoiding a departure from plane form to conical convex or concave form of the grinding disc as the disc is worn away in use, which departure from plane form tends to occur as soon as the supply of abrasive ceases to be adequate over any part of the operating surfaces of the nogs.

It has been found that the active surface of the bottom grinder disc does not always remain flat and that it becomes deformed with wear, the wear of the outer areas being generally greater than those of the interior areas. This difference in wear is maximum when the runner is new and possesses its whole thickness, as it is particularly at that time that the interior areas are less well fed with sand and water, since the channels have original depth.

A main object of the present invention is to provide an improved regulated feed of abrasive fluid to the surfaces of the nogs of bottom grinder discs in apparatus for grinding a horizontally moving ribbon of glass, including those grinder discs having elongated nogs extending from the central cavity to the periphery.

The invention comprises apparatus for grinding the under face of a horizontal moving ribbon of glass including a series of bottom grinder discs each having the operating surfaces separated by a series of channels surrounding a central cavity on the disc to which cavity abrasive in suspension is fed under pressure through the hollow driving shafts of the respective discs characterised in that means are provided for blocking off the lower parts of the inner ends of the channels to obstruct flow therethrough from said cavity, while leaving the upper parts of the inner inlet ends adjoining the plane of the operating surface of the disc open to serve as inlets. In the specific embodiment of the present invention, the means for blocking off the lower parts of the inner ends of the channels take the form of a cylindrical wall located in the cavity in juxtaposition with the inner ends of the distributing channels, the top of the wall being spaced a predetermined distance above the bottom of the channels and below the plane of the operating face of the disc, so that for a given pressure on the abrasive fluid the space between the rim of the wall and the underface of the ribbon of glass is always filled by the abrasive fluid passing to the grinder disc.

The cylindrical wall may be removable so as to be replaceable by cylindrical walls of progressively less height to conform to the circumstance arising from the continual wear on the face of the respective grinder discs or the cylindrical wall can be adjustable as hereinafter explained.

Conveniently, the cylindrical wall is incorporated in a pan located in the central cavity of each grinding disc, which pan is mounted on a tube entering the bottom of the pan and formed as an axially adjustable extension to the bore of the respective hollow shaft, the peripheral wall of the pan being maintained at a level such that the suspension fed through the hollow shaft and the tube extension into the pan is delivered over the pan wall and near the operating surfaces of the grinding discs into the channels in the operating face of the disc.

In order that the invention may be more clearly understood the preferred embodiment thereof will now be described, by way of example, with reference to the accompanying diagrammatic drawings, in which:

Figure 1 is a central sectional elevation through the bottom tool of one pair only of a series of coaxial tools which simultaneously operate on both surfaces of a horizontal ribbon of glass at it is advanced between the tools, and Figure 2 is a fragmentary plan of the bottom grinder disc and cylindrical pan included in the construction illustrated in Figure 1, the wall of which pan controls the distribution of the abrasive fluid to the operative surfaces of the bottom grinder disc.

In the drawings the bottom grinder disc is indicated at 1 and a fragment of the coaxial upper grinder disc is indicated at 2. The coaxial discs are driven, in known manner, the drive to the bottom disc being along a shaft indicated at 3, bevel gears 4, 5, the gear 5 being connected in driving relation with a hollow spindle 6 by a long key 7, thus the spindle is driven by the gears but is vertically slidable through the gear 5.

The gears 4, 5 are housed in a fixed housing 8 carried on supports indicated at 9, and the housing carries a sleeve 10 provided with a rack 11 in operative relation with a pinion 12. The sleeve is provided with races 13 for the hollow spindle 6.

The spindle has a head flange 14 by which it is secured to an adaptor plate 15 on which is mounted the usual backing plate 16 on which the disc 1 is fixed. Thus in known manner the gears 4, 5 transmit the necessary power to cause the rotation of the grinder disc, and the level of the operating surface of the disc is adjusted by operating the rack and pinion gear 11, 12.

The disc 1 comprises the usual central cavity 17 which is surrounded by the annular series of nogs indicated at 18 which are separated by distributing channels 18a, the inner inlet ends 18b of the channels communicating with the central cavity 17, the top faces of the nogs forming the operating surface of the disc.

In accordance with the present invention, means are provided for blocking off the lower parts of the inner inlet ends 18b of the channels to obstruct flow therethrough from the cavity 17, comprising a pan 19 having a cylindrical wall 20, said pan being located in the central cavity and being mounted on a tube 21 which is coaxial with and passes into the bore of the driving spindle 6 so that the suspension of sand in water constituting the abrasive fluid, usually fed to the disc instead of being constrained to flow into the cavity from the bore of the driving spindle 6 is caused to flow through the coaxial tube 21 into the pan, the top of which tube opens into the pan.

The upper end of the tube 21 is mounted in a sealing gland 22 extending through the adaptor plate into the top of the spindle 6, and the lower end of the tube is mounted in a coaxial double thrust ball-bearing generally indicated at 23, which bearing is secured within a plate 24 adjustably connected to the supporting housing 8. The adjusting means comprises threaded studs 25 mounted on a tubular extension 26 to the housing 8, and nut members 27, by the operation of which the tube 21 and pan 19 can be axially moved.

The adjustment of the level of the rim of the cylindrical wall 20 of the pan 19 with respect to the underface of the ribbon of glass, indicated at 28, is such that for a given hydrostatic head on the abrasive fluid a confined space 29, defined between the said rim and the glass, is always full of the abrasive fluid, which is thereby directed out of the pan radially in all directions into the inner inlet ends 18b of the channels in the operating surface of the disc and in the vicinity of the plane of the operating face of the disc. Thus the cylindrical wall 20 of the pan serves to block off flow through the lower parts of the channel inlet ends 18b and functions as a weir over which constantly flows an adequate volume of abrasive fluid to ensure the maintenance of a film of abrasive over the operating surfaces of the nogs 18. In particular the wear on the operating surfaces near the central cavity of the disc is substantially the same as occurs on the operating surfaces near the rim of the disc—hence the creation of a convex form in the disc, due to uneven wear, is avoided.

Generally speaking the spacing of the rim of the pan from the glass is of the order of 4 mm., and this setting is obtained by suitably actuating the nut members 27. As the nog surfaces wear, the grinder disc is raised in known manner by actuating the gear 12; but the pristine setting of the rim of the pan with respect to the plane of the operative surfaces of the disc remains unaltered.

The pan is preferably made as a fit in the central cavity of the disc, but if the pan does not rotate with the disc an anti-friction bearing (not shown) will be provided between the tube 21 and the driving spindle 6.

The foot end of the tube 21 may be seated in a cup 30 carried by brackets 31 secured to the housing 8, a gland 32 sealing the end of the tube 21 in the cup.

An abutment 33 which is axially adjustable with respect to the operating surface of the grinder disc 1 may be carried on a cage 34 supporting a tapped plate 35 for the threaded shank of the abutment 33 so as to provide a support for the glass 28 when the latter sags into the central cavity of the disc, which tendency increases the thinner the glass being treated in the apparatus. This tendency is aggravated if there is a lowering of air pressure in the central cavity, such as does occur when a depression is formed in the fluid in the central cavity. The cage 34 may be erected on a boss 36 having webs 37 set up on the pan bottom, the boss receiving the top end of the tube 21.

The adaptor plate 15 is provided with a plurality of vents, one of which is indicated at 38.

Though the bottom grinder described comprises a central cavity which in plan view is circular the configuration can be modified within limits as will be well understood by those skilled in the art e. g. the configuration could be that an ellipse where the difference in length of the major and minor axis was of the order of one or two centimeters, or the circular form described could be approximatel by utilising a polygonal configuration including a large number of faces.

If a cylindrical wall only is employed, i. e. by eliminating the bottom of the pan 19, radial members may be used to rigidly connect the wall with the coaxial tube 21.

By the present invention a regulated feed of the abrasive fluid into the inner ends of the distributing channels may be achieved and an adequate supply of the fluid to the inner nogs of the grinder disc maintained.

I claim:

1. In an apparatus for grinding both surfaces of a ribbon of glass as it is advanced in a horizontal plane, the combination comprising a rotatable grinding disc on the lower side of the horizontal plane of travel of the ribbon for grinding the lower surface of the ribbon, said disc having a central cavity and defining a series of distribution channels having their inner inlet ends communicating with said cavity and leading to the operating face of the disc, means for blocking off the lower parts of the inner ends of the channels to prevent flow therethrough from said cavity, while leaving the upper parts of the inner ends adjoining the plane of the operating surface of the disc open to serve as inlets, and while leaving the parts of the channels outwardly beyond said inner ends free to receive abrasive fluid to their full depths down to levels below the bottom levels of said inlets, and means for delivering abrasive in fluid suspension to said cavity under such pressure as to maintain said inlets full of the abrasive fluid while said bottom disc is operatively rotating.

2. In an apparatus for grinding both surfaces of a ribbon of glass as it is advanced in a horizontal plane, the combination as described in claim 1, wherein the cavity is circular and the blocking means comprises a circular wall located in the cavity in juxtaposition with the inner ends of the distributing channels, the top of the wall being spaced below the plane of the operating face of the disc, whereby under the working pressure on the abrasive fluid, the space between the upper rim of the wall and the undersurface of the moving ribbon of glass is maintained full of the abrasive fluid passing to the disc as the disc rotates.

3. In an apparatus for grinding both surfaces of a ribbon of glass as it is advanced in a horizontal plane, the combination as described in claim 2, characterized in that a hollow shaft depending from the center of the disc is provided to drive said disc, the circular wall constitutes the peripheral wall of a pan in said cavity and the means for delivering the fluid abrasive comprises a tube entering the bottom of the pan and extending along the bore of said shaft.

4. In an apparatus for grinding both surfaces of a ribbon of glass as it is advanced in a horizontal plane, the combination as described in claim 3, wherein the tube has a rigid connection to the pan and is adjustable lengthwise to adjust the level of the rim of said wall.

References Cited in the file of this patent

UNITED STATES PATENTS

| | | |
|---|---|---|
| 2,041,642 | Griffin | May 19, 1936 |
| 2,673,423 | Hoyet et al. | Mar. 30, 1954 |
| 2,699,021 | Laverdisse | Jan. 11, 1955 |